T. L. STURTEVANT.
Stove.
No. 46,729.
Patented March 7, 1865.
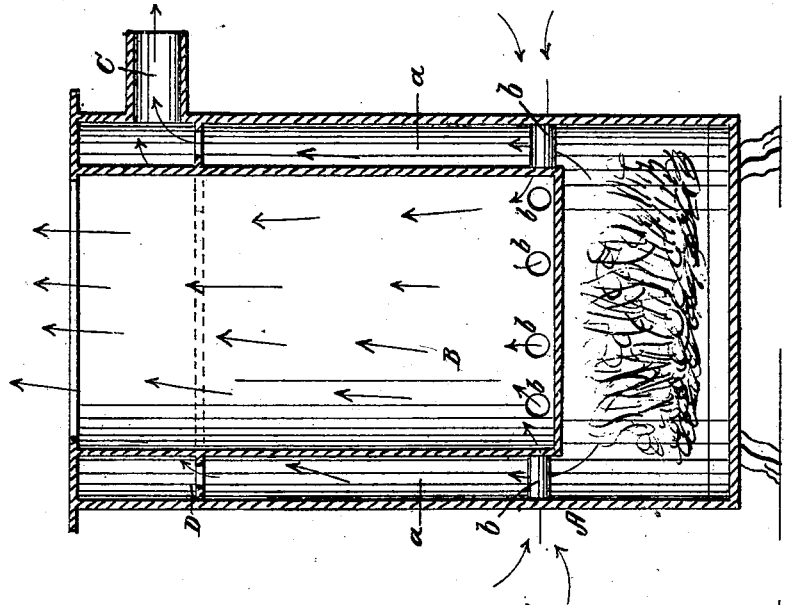
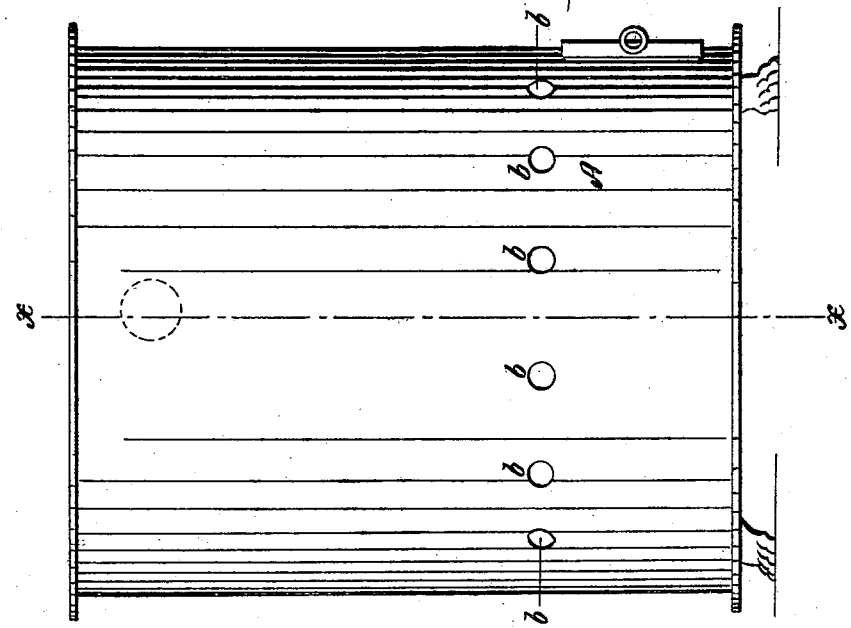

UNITED STATES PATENT OFFICE.

T. L. STURTEVANT, OF BOSTON, MASSACHUSETTS.

IMPROVED STOVE.

Specification forming part of Letters Patent No. 46,729, dated March 7, 1865.

*To all whom it may concern:*

Be it known that I, T. L. STURTEVANT, of Boston, in the county of Suffolk and State of Massachusetts, have invented a new and Improved Stove; and I do hereby declare that the following is a full, clear, and exact description thereof, which will enable others skilled in the art to make and use the same, reference being had to the accompanying drawings, forming part of this specification, in which—

Figure 1 is an external view of my invention; Fig. 2, a vertical section of the same, taken in the line $x\ x$, Fig. 1.

Similar letters of reference indicate like parts.

The object of this invention is to obtain a stove which will possess a greater heat-radiating surface and greater heat radiating capacity than any now constructed; and to this end its consists in providing the stove with an internal air-heating chamber, arranged in the manner hereinafter fully set forth.

A represents a stove of a form for burning wood, and B is a chamber fitted within the stove, the lower end or bottom of the former being a short distance above the fire-chamber, as shown clearly in Fig. 2. The chamber B is sufficiently smaller in diameter than A to admit of a space, $a$, between them of requisite capacity to serve as a flue to convey the products of combustion to the smoke-pipe C, the flue A being closed at its top, but the top of the chamber B being open.

The lower part of the chamber B communicates with the external air by means of small tubes $b$, which extend across the lower part of the flue $a$, as shown clearly in Fig. 2.

From the above description it will be seen that an exterior and an interior heat-radiating surface is obtained, and the products of combustion in passing up through the flue $a$ will, on account of being spread or diffused through a narrow space, part with their heat so that they will pass into the smoke-pipe C in a comparatively cool state.

On account of the rarefaction of the air in the chamber B, a cold current is induced to enter through the tubes $b$, the warm air passing out from the top of B into the room or apartment. (See red arrows, Fig. 2.) It will also be seen that the cold air in passing through the tubes $b$ is exposed in the most advantageous manner to the heat, as the tubes are completely surrounded by the products of combustion from the fire-chamber.

In order to have the products of combustion pass up through the space $a$ all around it as evenly or in as uniform a manner as possible, I employ a perforated partition plate, D, in the flue $a$ just below the pipe C. (See Fig. 2.) This renders the radiation of heat nearly uniform all around the stove.

I would remark that the principles herein set forth may be applied in the construction of a hot air furnace and other heating apparatus.

I claim as new and desire to secure by Letters Patent—

1. A stove provided with an internal air-heating chamber, B, open at its top, closed at its bottom, and communicating at its lower end with the external air by means of a number of radial tubes, $b$, which extend across the space or flue $a$ between the chamber B and the case of the stove, substantially as and for the purpose specified.

2. In connection with the air-heating chamber B, arranged as shown, the perforated plate D, as and for the purpose set forth.

T. L. STURTEVANT.

Witnesses:
SAML. P. BENSON,
JOSEPH N. STURTEVANT.